UNITED STATES PATENT OFFICE 2,081,004

PROCESS FOR BREAKING PETROLEUM EMULSIONS

Melvin De Groote, St. Louis, and Arthur F. Wirtel, Kirkwood, Mo., assignors to Tretolite Company, Webster Groves, Mo., a corporation of Missouri No Drawing. Application September 18, 1936, Serial No. 101,432

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an alkylated naphthalene sulfonic acid in the form of a substituted cyclohexylamine salt of the kind in which at least one of the alkyl groups substituted in the naphthalene nucleus contains not less than three carbon atoms and not more than 10 carbon atoms. The substituted cyclohexylamine bodies are of the kind obtained by substituting a hydrocarbon radical for one or more hydrogen atoms in either the ring or amino hydrogen position. The more desirable type is the alkylated type. Such components are nuclear substituted products.

Commercial demulsifying agents employed for breaking or resolving oil field emulsions include, among other substances, substituted polycyclic aromatic sulfonic acids or their salts. The type which finds most frequent application is obtained by introducing one, two or more alkyl groups into a naphthalene residue and then producing the sulfonic acids; or else, by the equivalent procedure of alkylating the sulfonic acids. Due to the corrosiveness of the sulfonic acid, it is the usual practice to employ the reagent in the form of a salt, such as ammonium salt, potassium salt, sodium salt, etc.

We have found that if the alkylated polycyclic aromatic sulfonic acids of the kind previously described are neutralized by means of an alkylated cyclohexylamine of the kind hereinafter described, or by some other derivatives obtained by introducing a hydrocarbon radical as a substituent, one obtains a treating agent or demulsifying agent of unusual effectiveness. In order that the composition of these substituted, and more especially, the alkylated cyclohexylamines, may be more completely understood, they will be described subsequently in proper detail.

In co-pending application for patent Serial No. 69,222, filed March 16, 1936, by Melvin De Groote, Bernhard Keiser, Leonard L. Faure, and Arthur F. Wirtel, there is disclosed a process for breaking oil field emulsions by means of an alkylated naphthalene sulfonic acid in the form of a cyclohexylamine salt of the kind in which at least one alkyl group contains not less than three carbon atoms and not more than 10 carbon atoms.

Cyclohexylamine is obtained by the hydrogenation of aniline. Such complete hydrogenation converts an aromatic compound, into a hydrogenated cyclic compound, and thus for practical purposes, cyclohexylamine may be considered as a derivative of cyclohexane (hexamethylene). We have discovered that if a suitable alkylated naphthalene sulfonic acid is neutralized with an alkylated cyclohexylamine, or any other suitable substituted cyclohexylamine, one obtains a reagent of unusual effectiveness. Such alkylated cyclohexylamines, for example, may be obtained by complete hydrogenation of alkyl derivatives (homologues) of aniline, such as toluidine, methyl aniline, ethyl aniline, propyl aniline, butyl aniline, amyl aniline, dimethyl aniline, diethyl aniline, ethyl methyl aniline, benzyl ethyl aniline, or the like, such as are described in "Dictionary of Applied Chemistry", by Thorpe, vol. 1, p. 189 (1921). Complete hydrogenation of the aforementioned compounds yields the corresponding hydrogenated cyclic compounds, such as the following: methyl cyclohexylamine, ethyl cyclohexylamine, propyl cyclohexylamine, butyl cyclohexylamine, dimethyl cyclohexylamine, diethyl cyclohexylamine, ethyl methyl cyclohexylamine, etc. No distinction is made between isomeric forms, where various isomeric forms exist.

There does not appear to be any suitable explanation of this unusual superiority, and similarly, there does not seem to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

Apparently, there is some unlooked-for co-operation or chemical or physico-chemical relationship between the alkylated cyclohexylamine residue and the sulfo-aromatic polycyclic residue. The neutralization of other conventional acidic demulsifying reagents with alkylated cyclohexylamine does not seem to produce any marked improvement over the corresponding sodium or ammonium salts, and in many cases, yields an inferior product, thus indicating that apparently the increased value does not reside in an additive effect, due to the alkylated cyclohexylamine residue. Furthermore, the effectiveness of alkylated cyclohexylamine apparently is not enjoyed by various other amines which bear some similarity to this material, such as aniline, toluidine, propylamine, diamylamine, etc. In other words, if the same alkylated naphthalene sulfonic acids which are employed to produce the treating agent or demulsifying agent used in our process are neutralized with many other apparently kindred amines, one does not obtain a reagent that even begins to approach the effectiveness of the demulsifying agent used in our process. Similarly, if one neutralizes other sulfonic acids, which are known to be effective demulsifying agents, such as petroleum sulfonic acids of the mahogany acid type, with an alkylated cyclohexylamine, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the alkylated cyclohexylamine residue and the described sulfo-aromatic polycyclic residue in a single molecule, results in an unlooked-for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily perhaps as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the demulsifying agent contemplated by our process, consists in converting the naphthalene into either the alpha or beta naphthalene sulfonic acid, or a mixture of both, or in some instances, into a di- or even a tri-sulfonic acid, or a mixture of all the various types. In most instances there is no advantage in introducing more than one sulfonic acid group. In many instances it is unnecessary to use particular care to prepare either only the alpha sulfonic acid, or either only the beta sulfonic acid, because a mixture in which either one or the other predominates, or a mixture in which the alpha and beta sulfonic acids are present, is just as satisfactory as one sulfonic acid completely freed from the other type.

The alcohols employed, such as propyl alcohols, butyl alcohols, amyl alcohols, hexyl alcohols, decyl alcohols, etc., are converted into the acid sulfate, such as propyl hydrogen sulfate, etc. The naphthalene sulfonic acid and the alkyl hydrogen sulfate are combined in proportions so that one, two, three, or even four alkyl groups are introduced into the polycyclic aromatic residue. This condensation reaction is generally carried out in the presence of an excess of sulfuric acid. In some instances, the various reactions, such as sulfonation, sulfation, condensation, etc., are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the polycyclic aromatic nucleus, one could also introduce an alkyl residue from some other alcohol, as, for example, an alkylated group derived from ethyl or methyl alcohol, or one might introduce a group derived from various alcohols such as aryl, aralkyl, cyclic, hydro-aromatic alcohols, etc., but regardless of whether or not one introduces such other residues, it is necessary that at least one alkyl residue of the kind described, i. e., having at least three carbon atoms and not more than ten carbon atoms, be introduced into the naphthalene ring. Such compounds having some other substituent present, such as a methyl substituent, might be considered as being derived from methyl naphthalene instead of naphthalene, and thus, would fall within the class of chemical types or equivalents previously noted. It is immaterial as to the particular alcohol employed, or the particular isomeric form of the alcohol employed, although generally speaking, it is most desirable to use the one lowest in cost. It is immaterial whether one uses normal propyl alcohol, or isopropyl alcohol. It is immaterial whether one uses a normal butyl or isobutyl alcohol. It is immaterial whether the alcohol is a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, or a mixture of both, it is manifest that the alkyl group or groups can be introduced into various positions in regard to the position of the sulfonic acid group. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is our preference to produce our reagents from these alcohols, and in some instances, it is desirable to introduce different alkyl groups, such as a propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with an alkylated or substituted cyclohexylamine product in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that we prefer to use in practicing our process is obtained by a reaction in which three moles of isopropyl alcohol are reacted with one mole of naphthalene by the customary sulfation, sulfonation and condensation reactions. The resulting mixture consists largely of di-propyl naphthalene sulfonic acids and tri-propyl naphthalene sulfonic acids, with possibly small amounts of mono-propyl sulfonic acids and tetra-propyl sulfonic acids, and perhaps some di-sulfonic acids present. Generally speaking, it is easier to conduct the reaction so that the bulk of the sulfonic acid represents the beta type, although the alpha type may be produced, if desired. The product is neutralized with diethyl cyclohexylamine and is diluted with one or more solvents, so as to reduce its viscosity to that of ordinary castor oil, or slightly greater. The solvents which we preferably employ are a mixture of two or more of the following: Water, denatured alcohol, kerosene, or tar acid oil.

Among the reagents which are particularly effective are the alkylated cyclohexylamine salts of the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl-di-normal butyl naphthalene sulfonic acids, di-isopropyl-di-normal butyl naphthalene sulfonic acids, di-isopropyl-mono-amyl naphthalene sulfonic acids, mono-isopropyl-mono-hexyl naphthalene sulfonic acids, etc.

It may be desirable to indicate that there is sometimes some variation in nomenclature in regard to the salts derived from strong acids and various amines. For instance, the combination of aniline, and hydrochloric acid, is often referred to as aniline hydrochloride. When aniline hydrochloride is treated with caustic soda, aniline is regenerated and sodium chloride is formed. For this reason, and perhaps for other reasons, structural conditions are best expressed by referring to the compound as a hydrochloride, in order to indicate that one does not obtain the chloride of a quaternary ammonium compound. Similarly, the reaction of an alkylated cyclohexylamine with a sulfonic acid may be considered as producing the alkylated cyclohexylamine salt, although for reasons pointed out, such salt might be looked upon as an alkylated cyclohexylamine hydrogen sulfonate, as well as being considered as an alkylated cyclohexylamine sulfonate. Insofar that it is perfectly clear as to the chemical composition of the compound, it is immaterial which nomenclature is employed.

In such instances where there is present more than one sulfonic acid group, as in the formation of di-sulfonic acids, or tri-sulfonic acids, if desired, all the sulfonic acid hydrogens may be neutralized with an alkylated cyclohexylamine, or, if desired, only one sulfonic acid hydrogen may be neutralized with an alkylated cyclohexylamine, and the other sulfonic acid hydrogen atom or atoms may be neutralized with some other suitable base, such as sodium hydroxide, potassium hydroxide, ammonium hydroxide, etc.

Alkylated cyclohexylamine salts, such as the hydrochloride, may react by double decomposition with alkali sulfonates in a suitable medium to produce the alkylated cyclohexylamine sulfonate.

It has been pointed out that in the broadest aspect the present application is concerned with a process of breaking emulsions by means of a reagent consisting of or comprising certain alkylated polycyclic aromatic sulfonic acids of the kind herein described, which have been neutralized with a substituted cyclohexylamine. The substituted cyclohexylamines are those in which at least one hydrogen of the cyclohexane ring or one of the amino hydrogen atoms has been replaced by a hydrocarbon radical or group. Such hydrocarbon radicals or groups may be of various kinds, such as aryl, alkyl, aralkyl, hydroaromatic, cyclo-aromatic, cyclic, etc., in nature. If cyclohexylamine be indicated by the following formula:

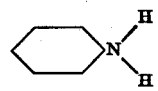

then the derivatives may be indicated by the formula:

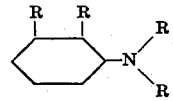

In the second formula, at least one occurrence of R represents a hydrocarbon radical of the kind previously referred to, and the other occurrences of R may represent the same or a hydrogen atom. There is no intention to be limited to any specific isomeric form. It is to be noted that in these two formulas, the hexagon represents the cyclohexane nucleus, and not the benzene nucleus, as is often the case. It will be noted that the above variations include those in which one or two hydrogens in the ring are replaced without substitution in the amino hydrogen position, or in which one or both hydrogens in the amino position have been replaced without substitution in the ring, or variations in which one or both hydrogens in the amino position have been substituted with simultaneous substitution in the ring position, or variations in which one or two hydrogens in the ring position have been substituted with simultaneous substitution in one or both of the amino hydrogen positions. Such products are obtained by complete hydrogenation of methyl aniline, ethyl aniline, benzene ethyl aniline, diphenylamine, ethyl toluidine, dimethyl toluidine, ethyl xylidene, toluidine, xylidene, etc.

It may be desirable to point out once more that the various products obtained in the manner previously described may be considered as substituted ammonium salts, but not salts of quaternary ammonium bases. In other words, in no case are the compounds comparable to those in which the four hydrogens of an ammonium radical have been replaced by organic groups. For instance, diethylcyclohexylamine in which the diethyl group replaces the amino hydrogens, when used as a base to neutralize the sulfonic acids, may be considered as producing a cyclohexylamine diethyl ammonium sulfonate, in which there still is one unsubstituted hydrogen atom in the ammonium radical, or the material may be considered as a diethylcyclohexylamine hydrogen sulfonate, as previously described.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than an alkylated cyclohexylamine, or the like.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

Having thus described our invention, what we claim as new and desire to secure by Letters Patent is:

1. A process for breaking petroleum emulsions of the water-in-oil type, which consists in subjecting the emulsion to the action of a demulsifying agent comprising a substituted cyclohexylamine salt of an alkylated naphthalene sulfonic acid in which at least one alkyl group substituted in the naphthalene nucleus contains at least three carbon atoms and not more than ten carbon atoms; the substituent of the cyclohexylamine radical being a hydrocarbon radical.

2. A process for breaking petroleum emulsions of the water-in-oil type, which consists in subjecting the emulsion to the action of a demulsifying agent comprising a substituted cyclohexylamine salt of an alkylated naphthalene sulfonic acid in which at least one alkyl group substituted in the naphthalene nucleus contains at least three carbon atoms and not more than ten carbon atoms; the substituent of the cyclohexylamine radical being a hydrocarbon radical, and substituted in the nuclear position.

3. A process for breaking petroleum emulsions of the water-in-oil type, which consists in subjecting the emulsion to the action of a demulsifying agent comprising an amino hydrogen substituted cyclohexylamine salt of an alkylated naphthalene sulfonic acid in which at least one alkyl group substituted in the naphthalene nucleus contains at least three carbon atoms and not more than ten carbon atoms; the substituent of the cyclohexylamine radical being a hydrocarbon radical, and substituted in the place of an amino hydrogen atom.

4. A process for breaking petroleum emulsions of the water-in-oil type, which consists in subjecting the emulsion to the action of a demulsifying agent comprising an alkylated cyclohexylamine salt of an alkylated naphthalene sulfonic acid, in which at least one alkyl group substituted in the naphthalene nucleus contains at least three carbon atoms and not more than ten carbon atoms; the substituted cyclohexylamine group being of the kind in which the alkyl group replaces an amino hydrogen atom.

5. A process for breaking petroleum emulsions of the water-in-oil type, which consists in subjecting the emulsion to the action of a demulsifying agent comprising an alkylated cyclohexylamine salt of an alkylated naphthalene monosulfonic acid, in which at least one alkyl group substituted in the naphthalene nucleus contains at least three carbon atoms and not more than ten carbon atoms; the substituted cyclohexylamine group being of the kind in which the alkyl group replaces an amino hydrogen atom.

6. A process for breaking petroleum emulsions of the water-in-oil type, which consists in subjecting the emulsion to the action of a demulsifying agent comprising an alkylated cyclohexylamine salt of a butylated naphthalene monosulfonic acid; the substituted cyclohexylamine group being of the kind in which the alkyl group replaces an amino hydrogen atom.

7. A process for breaking petroleum emulsions of the water-in-oil type, which consists in subjecting the emulsion to the action of a demulsifying agent comprising an alkylated cyclohexylamine salt of amylated naphthalene mono-sulfonic acid; the substituted cyclohexylamine group being of the kind in which the alkyl group replaces an amino hydrogen atom.

8. A process for breaking petroleum emulsions of the water-in-oil type, which consists in subjecting the emulsion to the action of a demulsifying agent comprising an alkylated cyclohexylamine salt of a tri-isopropylated naphthalene mono-sulfonic acid; the substituted cyclohexylamine group being of the kind in which the alkyl group replaces an aminohydrogen atom.

9. A process for breaking petroleum emulsions of the water-in-oil type, which consists in subjecting the emulsion to the action of a demulsifying agent comprising a diethylcyclohexylamine salt of tri-isopropylated naphthalene sulfonic acid.

10. A process for breaking petroleum emulsions of the water-in-oil type, which consists in subjecting the emulsion to the action of a demulsifying agent comprising a diethylcyclohexylamine salt of tri-isopropylated naphthalene sulfonic acid admixed with a suitable solvent.

11. A process for breaking petroleum emulsions of the water-in-oil type, which consists in subjecting the emulsion to the action of a demulsifying agent obtained by converting naphthalene into the mono-sulfonic acid; converting propyl alcohol into the acid sulfate; combining said materials in molecular proportions in presence of sulfuric acid as a condensing agent; followed by the conventional washing process and separation of the aqueous waste acid and neutralization of the sulfonic acid by means of di-ethylcyclohexylamine, followed by addition of a suitable solvent.

MELVIN DE GROOTE.
ARTHUR F. WIRTEL.